United States Patent Office 3,752,719
Patented Aug. 14, 1973

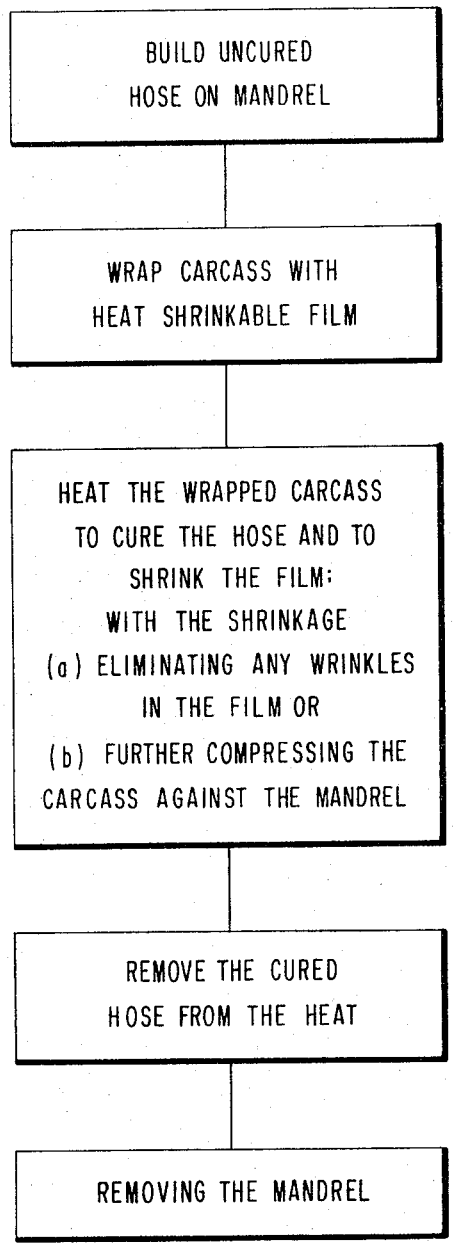

3,752,719
METHOD OF MAKING HOSE OR OTHER TUBULAR BODIES OF CURABLE ELASTOMERIC MATERIAL
Clarence W. Borden, Trenton, N.J., assignor to Goodall Rubber Company, Trenton, N.J.
Filed May 15, 1970, Ser. No. 37,572
Int. Cl. B32b *31/20;* B29c *27/20*
U.S. Cl. 156—84                                       10 Claims

ABSTRACT OF THE DISCLOSURE

Biaxially oriented heat shrinkable plastic film is wrapped around a mandrel-supported tubular body of uncured elastomeric material so that the application of curing heat will cause the film to shrink in directions which lie axially and circumferentially of the tubular body and remove wrinkles in the film and compress the tubular body.

---

This invention relates to a method of making conduits such as hoses by forming a carcass of uncured elastomeric material on a mandrel, wrapping the carcass and then curing the wrapped carcass by subjecting it to heat.

In the art of making hoses and other conduits from elastomeric materials, it is a common practice to "build" a tubular carcass of uncured rubber or other elastomeric material on a mandrel, by overlappingly helically wrapping uncured strips of stock rubber material and applying reinforcements such as wires, fabrics or braided layers when demanded by the service requirements of the particular conduit. Conventionally, the carcass is then compressed against the mandrel by helically wrapping it with a strip of nylon fabric under tension so that the layers of the carcass will be under a compressive force when subjected to the heat which vulcanizes or otherwise cures the body of the conduit. These strips or wrappers, customarily called "rags" protect the exterior surface of the carcass from direct exposure to the curing heat, and they also contract along their longitudinal dimensions which lie generally circumferential with respect to the conduit in order to promote bonding by applying an increased compressive force on the carcass.

The use of such nylon rags, although customary in this industry, is not entirely satisfactory. The rags are expensive, so economical production requires that they be reused two or three times or until they are no longer able to shrink enough to exert the desired amount of compression on the carcass when subjected to the vulcanizing heat. When these rags are used too many times, "fish scales" are produced in the carcass. "Fish scales" are thin flap-like extensions of the carcass produced by the flow of uncured elastomeric material into the interface area between overlapped portions of the helically wrapped rags, and they are particularly prevalent when the rags become unable to contract a sufficient amount when subjected to vulcanizing temperatures.

A particular difficulty posed by the prior techniques is that they require some care in the wrapping of the carcass with the nylon rags. Since the rags are wrapped under tension, there is a tendency for wrinkles to extend longitudinally of the rags so that they will form undesired ridges or projections on the completed hose. Total avoidance of such wrinkles is possible, but this requires great care, thereby slowing down the production rate.

According to this invention, a carcass built or otherwise placed on a mandrel is wrapped with a heat shrinkable plastic film. The carcass and the film are then heated in order to cure the elastomeric material and to shrink the film. The molecularly oriented thermoplastic film is preferably but not essentially biaxially oriented so that its shrinkage serves both to compress the carcass and to remove any undesired wrinkles created when the film is placed over the carcass. This latter feature simplifies the task of placing the wrapper around the carcass since it is no longer important to avoid the initial presence of wrinkles.

The drawing illustrates in diagrammatic form the process steps of the present invention.

Adoption of the technique disclosed in this specification is highly advantageous both from the standpoint of expense and the quality of the final product. Films suitable to the practice of the invention are commercially available and are considerably less expensive than the nylon rags used heretofore. Accordingly, the film wrappers may be used only once and discarded in order to avoid the possibility of producing "fish scales" which result from repeated use. The exterior surface of the hose produced according to this invention when using a smooth surfaced film does not have the numerous minute projections and depressions which are produced by nylon rags and objectionable when hose is destined for use in the food and beverage fields where cleanliness is essential. Furthermore, it has been found that practice of the invention disclosed herein results in a stronger bond between the layers of materials in the hose than had heretofore been possible.

Various types of heat shrinkable films may be used in practicing the invention. Preferably, the films are made of a material which does not melt, flow or sag when subjected to the temperature and time conditions usually used in vulcanizing rubber. It is common practice to vulcanize rubber hoses for about between one and two hours at a temperature of about 275–300° F. Shrink films formed of materials such as polybutylene, nylon and tetrafluoroethylene polymers are suitable to these vulcanizing conditions. In the event that such materials are not available or become prohibitively expensive, the invention may be practiced by using shrink films of polyvinyl chloride, but this would necessitate vulcanization at lower temperatures and for periods approximately three times that of conventional vulcanization processes. It is also contemplated that suitable films may be made from olefin polymers such as polypropylene and some forms of polyethylene.

The well-known characteristics of shrink films are that they possess a characteristic known as plastic memory, usually if not always resulting from stretching films when in an elastic heated state to elongate and orient their molecules, and then cooling the film while so stretched. The cooling step reduces the film temperature to a point where it dimensionally sets the material, and locks internal stresses therein. Then, when it is desired to shrink the film, it is reheated to a temperature exceeding the temperature which set the film dimensionally. The internal stresses are thus relieved to produce the desired shrinkage. Of course, if the temperature of reheating is too high or the reheating time is too great, certain plastic films will lose their strength and ability to exert any shrink tension, perhaps even melting or sagging so that they would not be useful in the practice of this invention which requires that the film continuously be under tension throughout the heating process.

An experimentally proven and high successful material for practicing the invention is the film form of a polybutene resin sold by Mobil Chemical Company, New York, N.Y. A sample thereof accompanies this specification. These films are initially manufactured by the blown film process wherein the heated flowable polymer is first extruded through an annular opening and then drawn through a set of pinch rolls at the top of a cooling tower. Air under pressure is injected into the bubble formed by the tubing between the extrusion die and the pinch rolls in order to expand the hot film transversely to increase its diameter. An air ring is mounted above the extrusion die to cool the film. Modern air rings are of the venturi type, blowing air at a high velocity along the exterior surface of the film bubble.

The film is stretch oriented in the longitudinal or machine direction (MD) by the pinch rolls or by draw rolls located immediately behind the picnh rolls. Oriented in the transverse direction (TD) is produced by the pressurized air within the bubble. The hot film, while stretched and in an elastic condition, is cooled to set its dimensions and lock in the internal stresses which give it the characteristic of shrinkability.

Preferably, the film used for the invention is smooth, uniform thickness, 2 mil polybutylene film identified as Exp. 250100 film by the distributor, Mobil Chemical Company. The characteristics of this film are given by the manufacturer as follows:

TABLE I

|  | MD | TD | Overall |
|---|---|---|---|
| Break strength, p.s.i. | 14,900 | 15,000 |  |
| Break elongation, percent | 33 | 32 |  |
| Tensile modulus, p.s.i. | 138,000 | 142,200 |  |
| Haze, percent |  |  | 1.2 |
| Gloss, 45° |  |  | 84 |
| Yield, per mil |  |  | 30,000 |
| Yield at 0.7 mil |  |  | 42,000 |
| Shrink percent: |  |  |  |
| 85° C. | 12.5 | 20.6 | 41 |
| 95° C. | 18 | 30 | 42 |
| 105° C. | 22 | 35 | 49 |
| 115° C. | 27 | 43 | 58 |
| Shrink tension, p.s.i. (95° C.) | 35 | 450 |  |
| $O_2$ permeability (25° C.) [cc.(STP)mil/ day-100 sq. in: atm.] |  |  | 450 |
| Water vapor permeability (25° C.)[g-mil/ day-100 sq. in. atm.] |  |  | 7.0 |

It is thought that satisfactory results may be produced by other films made by following the film-forming techniques recommended by Mobil in connection with polybutylene resins which have the following characteristics (based upon compression molded specimens conditioned 10 days at 23° C., 50% relative humidity):

TABLE II

| | |
|---|---|
| Density (ASTM method D1505–63T) | 0.91 gram/cm.³ |
| Melt Index (ASTM method D1238–57T) | 1.8. |
| Yield strength (ASTM method D638–66T) (Die C, 20″/min.) | 2200 p.s.i. |
| Tensile strength (ASTM method D638–66T) | 4200 p.s.i. |
| Percent elongation at break (ASTM method D638–66T) | 360 percent. |
| Modulus of elasticity (ASTM method D638–66T) | 35000 p.s.i. |
| Izod impact strength (ASTM method D256–56) | No break. |
| Melting point range | 255–259° F. |
| Softening point, Vicat (ASTM method D1525–65T) | 226° F. |
| Brittleness temperature (ASTM method) D746–64T) | −13° F. |
| Shore Hardness (ASTM method D1706–61) | 53 D scale. |
| Environmental stress crack resistance (ASTM method D1693–60T) | No failures (2000+ hours). |

Typical characteristics of certain polybutylene films considered applicable to the practice of this invention are given in the following table:

TABLE III

|  | MD | TD | Overall |
|---|---|---|---|
| Gauge, mils |  |  | 2 |
| Elmendorf tear test (ASTM Method D1922–61T) grams/mil. | 960 |  |  |
| Dart drop impact ($F_{50}$) 26 in. (ASTM Method D1709–62T) (Method B) grams |  |  | 325–350 |
| Yield strength, (ASTM Method D882–64T) p.s.i. | 2250–2550 | 2250–2550 |  |
| Tensile strength at break, (ASTM Method D882–64T) p.s.i. | 3,200–3,600 | 3,400–3,700 |  |
| Elongation at break, (ASTM Method D882–64T) percent | 155–180 | 155–175 |  |
| Elastic modulus, (ASTM Method D882–64T) p.s.i. | 35,000–37,500 | 34,500–38,000 |  |

The shrinkability of the film may vary from that indicated, and it is contemplated that satisfactory results will be available with films capable of shrinking from 10% to 75% in a machine direction and from 25% to 55% in the transverse direction. Improvement over prior art techniques will in fact be found when the film is shrinkable in only one direction.

The process of the invention is suitable for use in manufacturing all types of tubular products from curable elastomeric materials, although its principal applicability is thought to be in connection with the manufacture of rubber hoses. Several examples of hose manufacture are given below.

EXAMPLE 1

A four ply carcass including layers of rubber and duck reinforcement was built up on a mandrel to form a three foot length of ¾ inch hose. A three inch wide strip of biaxially oriented polybutylene film (Exp. 250100) was used for a wrapper, with the machine direction of orientation (MD) extending longitudinally of the strip. The strip was overlappingly helically wound around the carcass under tension to compress the carcass against the mandrel located therewithin. This wrapping step formed wrinkles extending longitudinally in the film which also were imparted to the exterior surface of the carcass. The wrapped hose and the mandrel were cured at 282° F. for one and one-half hours. After cooling to atmospheric temperature, the polybutylene strip and the mandrel were removed, and an inspection revealed an extremely smooth exterior surface on the hose. The superiority of the product was attributed both to the ability of the film to shrink in the transverse direction (TD) to remove the wrinkles initially formed therein during the wrapping step, and to the shrinkability of the strip in the machine direction (MD) which served to compress the carcass against the mandrel throughout the entirety of the vulcanization process and to provide an excellent seal between overlapping portions of the film which avoided the fish scale defect.

EXAMPLE 2

A 50 foot length of ½ inch four ply hose was made in the same manner as described in Example 1. Testing of the product revealed that there was a stronger bond between the reinforcing duck fabric and the rubber layers adjacent. Specifically, it was found that there was an increase of four pounds in the adhesion of the outer cover to the duck and an identical increase in the adhesion between the duck and the tube therewith. This represents an increase of about 5%-10% in the bond strength.

EXAMPLE 3

An externally corrugated four inch hose was made by building a carcass on a mandrel, much in the same manner as described in connection with Example 1. The polybutylene film was wrapped around the carcass and then the carcass was "corded" by helically wrapping a nylon rope therearound to provide a series of projections and depressions which extend helically along the length of the carcass. The carcass was vulcanized and, upon cooling, it was discovered that, apparently due to the forces exerted by the rope, the polybutylene film had adhered to the hose cover and could not be removed without tearing sections of the cover.

EXAMPLE 4

A hose was made in the manner described in Example 3, except that the outer cover of the carcass was dusted with a release agent such as Italian talc, mica flour or soapstone before the polybutylene film was wrapped around the carcass. After vulcanization, it was found that the wrapper was easily removed. On succeeding experimental runs, the cover stock was changed to establish that the film could similarly be removed from other elastomeric materials including natural rubber, neoprene and styrene butadiene rubber.

It is believed that this invention may be used in all hose forming processes of the type which require wrapping of a carcass prior to a curing or vulcanization step. Hose bodies may have woven or braided reinforcement, wire or textile fabric reinforcements or embedded helical reinforcement wires. In all instances, it is believed that the resulting product will be smooth, relatively free from wrinkles, and that there will be an improved degree of adhesion or bonding between the various components of the hose structure. The smooth exterior finish is extremely desirable in hoses destined for use in food processing plants and other environments where sanitation is important.

While this specification has described the preferred embodiment of the invention, those skilled in the art will appreciate that the invention may be modified and adapted to the manufacture of hand made or machine made hoses or other types of tubular bodies. The shrink film may be a seamless cylindrical body concentric with the axis of the tubular carcass, or it may have a substantial length and be wrapped around the tubular carcass so that its edge runs longitudinally thereof. While polybutylene is the preferred material of the shrink film, it is possible to use oriented films of nylon, polytetrafluroethylene or any other material which is capable of shrinking and maintaining compressive forces on the tubular carcass at the conditions required to cure the elastomeric material. The elastomeric material may be natural rubber, synthetic rubber or any other organic polymeric material which exhibits the rubber-like characteristics of strength, resilience and flexibility. Synthetic rubbers which may be used include Buna-S, Buna-N neoprene and the like. The tubular bodies may be of varying cross-sectional shapes and dimensions and they may include any desired arrangement of braided or helically wound reinforcements.

In view of the diverse applicability of this process, it is stressed that the invention is not limited to the preferred and disclosed embodiments, but is to be construed in accordance with the terms and spirit of the claims which follow:

What is claimed is:

1. A method of making a tubular body of elastomeric material comprising the steps of
   (a) placing a tubular carcass of uncured elastomeric material on a mandrel;
   (b) helically wrapping a strip of biaxially oriented heat shrinkable plastic film around the carcass under tension to create undesired wrinkles in the film;
   (c) heating the carcass and the film to
      (i) shrink the film in a direction which is longitudinal with respect to the carcass to remove the wrinkles prior to the completion of the curing of the carcass;
      (ii) shrink the film in a direction which is circumferential to the carcass to compress the carcass radially against the mandrel; and,
      (iii) cure the elastomeric materials; and
   (d) removing the mandrel.

2. The method of claim 1 wherein step (a) includes the step of helically wrapping a strip of uncured elastomeric material around the mandrel.

3. The method of claim 1 wherein, between steps (b) and (c), a cord is helically wrapped around the carcass to provide a helically arranged series of depressions and projections in the carcass prior to the curing step.

4. The method of claim 1 including the step of removing the film from the carcass subsequent to the curing step.

5. A method of making a tubular body of elastomeric material comprising the steps of
   (a) placing a tubular carcass of uncured elastomeric material on a mandrel;
   (b) wrapping the tubular carcass with a heat shrinkable plastic film, with the film having undesired wrinkles therein at the conclusion of the wrapping step:
   (c) heating the carcass and the film to
      (i) first shrink the film to remove the wrinkles; and,
      (ii) then cure the elastomeric materials; and,
   (d) removing the mandrel.

6. The method of claim 5 including the step of removing the film from the carcass subsequent to the curing step.

7. A method of making a tubular body of elastomeric material, comprising the steps of
   (a) surrounding a mandrel with a tubular body of uncured elastomeric material,
   (b) helically wrapping a strip of oriented heat-shrinkable organic polymer sheeting around the tubular body,
   (c) heating the wrapped tubular body to
      (i) cure the elastomeric material,
      (ii) shrink the strip in the circumferential direction of the tubular body to compress the tubular body against the mandrel and,
      (iii) shrink the strip in the axial direction of the tubular body to remove any wrinkles which may have been made in the strip during step (b), thereby providing a smooth surface in the tubular body.

8. The method of claim 7 including the step of removing the film from the carcass subsequent to the curing step.

9. A method of making a tubular body of elastomeric material comprising the steps of
   (a) placing a tubular carcass of uncured elastomeric material on a mandrel;
   (b) surrounding the tubular carcass with a heat shrinkable polybutylene film;
   (c) heating the carcass and the film to
      (i) shrink the film in a direction which is circumferential to the carcass to compress the carcass radially against the mandrel; and,
      (ii) cure the elastomeric materials; and
   (d) removing the mandrel.

10. The method of claim 9 including the step of removing the film from the carcass subsequent to the curing step.

References Cited

UNITED STATES PATENTS

| | | | |
|---|---|---|---|
| 3,296,047 | 1/1967 | Parr | 156—187 X |
| 3,037,529 | 6/1962 | Hancik | 156—85 X |
| 2,941,911 | 6/1960 | Kumnick et al. | 156—162 X |
| 3,293,097 | 12/1966 | Peterson et al. | 156—86 X |

FOREIGN PATENTS 862,795   6/1959   Great Britain ........ 156—86

BENJAMIN A. BORCHELT, Primary Examiner

J. V. DORAMUS, Assistant Examiner

U.S. Cl. X.R.

156—86, 162, 173